United States Patent
Alley et al.

[19]

[11] Patent Number: 5,930,678
[45] Date of Patent: Jul. 27, 1999

[54] INTERMODULATION DISTORTION REDUCTION METHOD AND APPARATUS

[75] Inventors: Gary Dale Alley, Londonderry, N.H.; Yen-Long Kuo, Andover, Mass.

[73] Assignee: Lucent Technologies Inc, Murray Hill, N.J.

[21] Appl. No.: 08/645,302

[22] Filed: May 13, 1996

[51] Int. Cl.⁶ .............. H04H 1/02; H04N 7/10; H04J 15/00
[52] U.S. Cl. .............. 455/6.1; 455/5.1; 455/68; 455/69; 370/6; 348/6; 348/7
[58] Field of Search .............. 348/6, 7, 12, 13; 455/3.1, 5.1, 6.1, 4.2, 68, 69; 370/73, 38, 39, 40, 71, 72, 120, 123, 6

[56] References Cited

U.S. PATENT DOCUMENTS

| | | |
|---|---|---|
| 3,898,566 | 8/1975 | Switzer et al. |
| 4,384,291 | 5/1983 | Lewis et al. ............................ 343/17.2 |
| 4,519,067 | 5/1985 | Friedrich .................................. 455/68 |
| 4,532,543 | 7/1985 | Groenewegen .............................. 455/6 |
| 5,125,100 | 6/1992 | Katznelson ................................ 455/6.1 |
| 5,450,392 | 9/1995 | Waltrich ..................................... 370/6 |
| 5,555,016 | 9/1996 | Rhodes et al. .............................. 348/6 |
| 5,619,248 | 4/1997 | Hobden et al. ............................. 348/6 |

FOREIGN PATENT DOCUMENTS 2930659  7/1979  Germany .

OTHER PUBLICATIONS

Katznelson, Ron (Applicant and Inventor), International Patent Application Publication No. WO 92/00633 published Jan. 9, 1992 entitled "Optimal Signal Synthesis for Distortion Canceling Multicarrier Systems".

*Primary Examiner*—Tommy P. Chin

[57] ABSTRACT

A method and apparatus for providing spectral control of intermodulation products in communications systems to reduce the distorting and interfering effects of system nonlinearities. The method provides a technique which controls the phases of video carriers in order to minimize second and third order intermodulation distortion products both in-band and out-of-band.

17 Claims, 10 Drawing Sheets

INTERMODULATION DISTORTION REDUCTION METHOD AND APPARATUS

FIELD OF THE INVENTION

The present invention relates to communications systems, and more particularly to multicarrier communications systems.

BACKGROUND OF THE INVENTION

Multicarrier communications systems, such as community antenna television systems (CATV), use coaxial cable to distribute standard TV signals to homes or establishments subscribing to the service. The TV signals may originate at a distant broadcast station or studio, or may be locally generated within the facilities of the CATV system. A specially designed antenna system (community antenna), which provides freedom from noise, interference, and multipath distortion not obtainable directly at the subscribers' homes, may be used to pick up the TV signals generated at remote locations.

A typical CATV system comprises four main elements: (1) a head end, in which the signals are received and processed; (2) a trunk system, the main artery carrying the composite signal; (3) a distribution system, which is bridged from the trunk systems and carries signals to subscriber areas; and (4) subscriber drops, fed from taps on the distribution system to feed into the subscribers TV receiver. Each TV signal or channel modulates a dedicated carrier frequency which carries the TV signal over the cable system (e.g. linear lightwave transportation and coaxial cable transportation) to the subscribers. The modulated carriers, however, are combined at the headend into a composite multicarrier signal that is distributed to the subscribers of the system (hence the name multicarrier system).

In a typical CATV multicarrier system, it is not uncommon for a composite signal to experience losses on the order of 20 dB across a kilometer of coaxial cable. As a result, in modern systems the composite signal is distributed on linear lightwave trunks to a fiber node from which the coaxial portion of the distribution network originates. In the coaxial portion of the network, the composite signal is typically amplified by up to 4 coaxial amplifiers before it reaches the customer's home. The linear lightwave subsystem together with the coaxial amplifiers introduce nonlinearities into the system. The resulting distortion causes substantial losses in dynamic range of the composite signal. That is, the presence of the linear lightwave transmitter and receiver, and the coaxial amplifiers, causes the ratio of the signal to the noise and distortion of the transmission to degrade with distance.

Heretofore, there have been several proposed solutions to the problems associated with the nonlinear distortions and limited dynamic range of such multicarrier, multichannel systems. One solution was disclosed in U.S. Pat. No. 3,898,566, issued to Switzer et al. on Aug. 5, 1975 (hereinafter Switzer). Switzer asserted that the nonlinear distortions of the system caused intermodulation distortions within the band of carrier frequencies of the composite signal. From this, Switzer further asserted that the intermodulation distortions caused the composite signal to substantially degrade over relatively short distances, and that as the number of channels on the system increase, the effects of intermodulation distortions also increased. That is, Switzer asserted that system nonlinearities enabled intermodulation distortion to limit the dynamic range of the composite signal and the number of channels that could be provided on the system. Thus, Switzer concluded that in order to provide more channels in one composite signal on the system, without substantially degrading system performance, the intermodulation distortion would have to be significantly reduced.

To reduce the intermodulation distortion, Switzer proposed making the multicarrier system harmonically related and coherent. That is, a system in which all carriers have frequencies that are integral multiples of a common fundamental frequency (harmonically related), and all carrier frequencies have phases that are adjusted or tuned with respect to each other (coherent). Switzer asserted that a composite signal composed of such harmonically related and coherent carrier frequencies reduces the peak to peak amplitude of the composite signal, and thus reduces the non-linear intermodulation distortions that degrade the composite signal. Basically, Switzer found a set of phases for a given set of carrier frequencies by cutting the lengths of the cables for each carrier so that, when combined into the composite signal, the carriers have a set of phases or a phase relationship with one another. Switzer asserted that the set of phases would reduce the peak-to-peak voltage of the composite signal, and thus reduce the intermodulation distortion that degrades the composite signal.

The phase adjustment method described in Switzer, however, is essentially ad hoc and relies on only one variable, the peak voltage of the composite signal, to determine the phase for each carrier in the system. This presents a problem of dimensionality for many large systems. That is, it is difficult to optimize a phase configuration in a system having many degrees of freedom (i.e. N channels) with only one parameter (peak voltage) to guide the process. Thus, the Switzer method presents a problem of practicality.

In addition, the Switzer method fails to consider the various effects on interchannel timing drifts and stability. This includes thermal effects, component aging and power variations between carriers. That is, even if Switzer sets the carriers to an initial set of optimum phases, the phases of each individual carrier would have to be periodically recalibrated to insure that the initial set of phases is maintained over time (i.e. the zero crossing of all the carriers must stay aligned by periodically adjusting for any phase offsets of the carriers). Switzer does not disclose nor claim any such realignment or readjustment to keep the phases aligned over time.

Moreover, Switzer failed to consider the effects of the intermodulation distortion on frequencies outside the band of frequencies of the multicarrier system. That is, in obtaining the set of phases for a given set of carrier frequencies, the Switzer method is directed to minimizing the intermodulation distortions on frequencies in the band of carrier frequencies. The effects of intermodulation distortion of the composite signal on out-of-band signals or frequencies (which may be of digital format) is not considered or addressed. Thus, the Switzer method does not insure a set of phases for a given set of TV carrier frequencies that would not substantially interfere with the other out-of-band signals being carried on the same transmission medium.

Another method of minimizing the effects of intermodulation distortion in multicarrier communications systems was disclosed in German Patent No. 2,930,659 A1, issued to Wolfgang Krick on Jul. 26, 1979, entitled "Process and Circuit Arrangement For Setting Phase Angles Between Coherent Carriers" (hereinafter Krick). Krick discloses a method for setting the phase angles of a given set of carrier frequencies comprising a composite signal according to a preset pattern.

Basically, Krick provides a method of setting the phases of the carriers so that the carriers have a predetermined phase relationship with respect to each other. That is, setting the phases for a specific set of carriers so that the carrier phases differ from each other according to some preset pattern. The method includes choosing a reference pair of adjacent carriers, and mixing the carriers to obtain an intermediate frequency sinusoid. The phase of this reference intermediate sinusoid is used as a reference phase for setting the individual phases of the carriers.

To set the individual phases of the carriers, a third carrier, being the next adjacent carrier to the reference pair on the frequency spectrum, is mixed with the closest carrier of the reference pair to obtain a second intermediate sinusoid having a second phase. The phase of the third carrier is then continuously shifted until the phase angle between the reference phase and the second phase corresponds to the preset pattern of values 0° and 180° only. This is done for each carrier of the system so that all the carrier phases are adjusted to the preset phase pattern.

As a result, Krick provides a method that requires the continuous monitoring of the intermediate sinusoid phases, and the incremental tuning of the carrier phases to maintain a preset pattern of carrier phases over time. Moreover, as with Switzer, Krick fails to even consider the effects of the predetermined phase pattern on out-of-band intermodulation distortion.

More recently, a method of minimizing intermodulation noise in multicarrier systems was disclosed in an international application published under the Patent Cooperation Treaty (PCT) on Jan. 9, 1992. The patent, entitled "Optimal Signal Synthesis For Distortion Canceling Multicarrier Systems", was issued to Ron D. Katznelson (hereinafter Katznelson). Katznelson disclosed a method and apparatus for minimizing the peak amplitude of the composite signal through a closed-loop feedback scheme.

Generally, Katznelson proposed adding a number of out-of-band auxiliary carriers, that extended up to five times the highest in-band frequency, to the composite signal. It was asserted that by adding these auxiliary carriers, with appropriate amplitudes and phases, the in-band intermodulation distortions products could be substantially minimized.

Although this method could be applied to broad band fiber optic transmission systems, it would not be applicable to present day coaxial cable systems due to bandwidth limitations. Moreover, the method of adding out-of band auxiliary carriers is not useful for systems having mixed analog/digital signal applications, where the out-of-band distortions due to analog signals should be controlled and minimized.

Katznelson also discloses a method of optimizing the phases of the carrier frequencies without the addition of auxiliary carriers. Generally, the object of the method is to reduce the in-band distortions by minimizing the peak amplitude of the composite signal. As in Switzer and Krick, however, the out-of-band distortions were never addressed or quantified.

SUMMARY OF THE INVENTION

Accordingly, the present invention is directed to a method and apparatus for controlling and minimizing both the in-band and out-of-band distortions of a multicarrier composite signal. To attain this, the present invention provides a method of controlling the video carrier phases so that, in the frequency domain, the composite signal has a second order distortion spectrum that is essentially a line spectrum, wherein the major portion of the total second order distortion energy is contained in the line which falls at zero frequency. This is achieved by using phases which are not limited to 0° and 180° as in Krick. The method can be applied to a harmonically related frequency plan (HRC), or to an incrementally related frequency plan (IRC).

In general, the method also makes the residual intermodulation distortion more tone-like which limits the peak to RMS voltage of the residual distortion waveform, and thus substantially minimizes the effects of non-linearities in the system. In addition, by controlling the second order distortion as described above, the method also substantially minimizes third order intermodulation effects. Moreover, since the second and third order intermodulation products have a lower power and also have a lower peak to RMS ratio, the method substantially minimizes the effects of system non-linearities on digital signals which are carried on the system in the portions of the frequency spectrum which are not occupied by the analog video carriers.

In one embodiment, the present inventive method is applied to a multi-frequency communications system of the type having a headend system that generates a composite signal, wherein the composite signal is composed of a plurality of harmonically related, or incrementally related, receivable signals that span an in-band frequency spectrum or group of in-band frequency spectrums. That is, the analog signal spectrum need not be continuous, rather there can be gaps in the analog spectrum. Digital signals, or other information may be carried in these gaps. The preferred embodiment, however, would have a continuous analog frequency spectrum.

The phases of the harmonically related receivable signals are set to a predetermined relationship with respect to each other such that the second order distortion spectrum of the composite signal is a line spectrum with the major portion of the total second order distortion energy contained in the line which falls at zero frequency. The system further includes a phase adjuster circuit for periodically adjusting the phase of each receivable signal so that the composite signal maintains the low value of second order distortion spectrum over time. Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

DETAILED DESCRIPTION OF THE INVENTION

Figure 1:
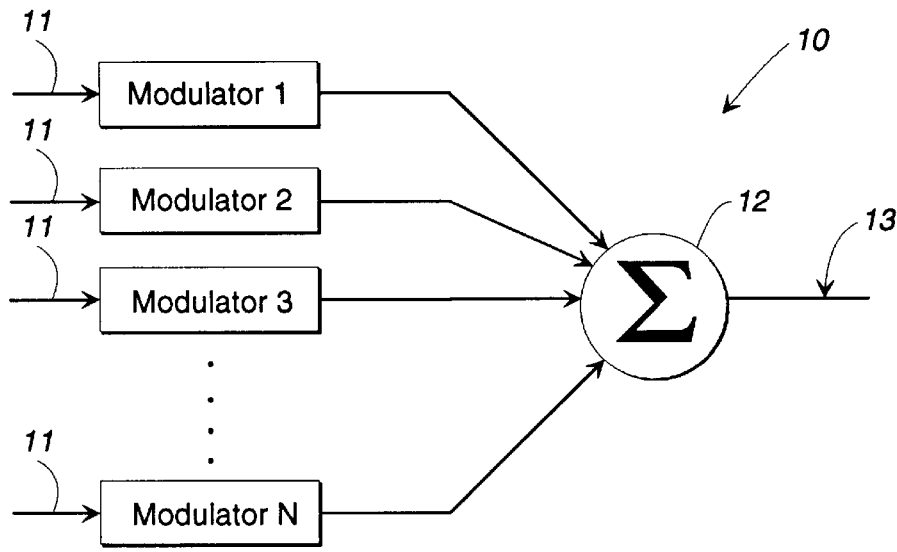
FIG. 1 is a block diagram of a typical multicarrier system.

In a typical multicarrier communication system, such as a CATV system, the carriers are combined into a composite signal through a multicarrier combiner located in the head-end of the system. FIG. 1 shows a circuit diagram of a typical multicarrier combiner 10. As shown, combiner 12 combines modulated carrier signals 11 into a composite signal 13 which is sent out over the optic fiber and/or coaxial cable to the subscribers.

For a multichannel communication system having 81 channels or carriers, the composite signal $V_o$ is approximated by:

$$V_o = \sum_{n=1}^{81} a_n(t)\cos(2\pi f_n t - \phi_n) \quad (1)$$

where $f_n$ is the frequency of the $n^{th}$ video carrier, an is the amplitude of modulation of $n^{th}$ video carrier and $\Phi_n$ is the phase of the $n^{th}$ video carrier.

The second order distortion $V_{2nd}$ (with the second-order nonlinear coefficient equal to unity), is given by:

$$V_{2nd} = \left(\sum_{n=1}^{81} a_n \cos(2\pi f_n t + \phi_n)\right)^2 \quad (2)$$

$$V_{2nd} = \sum_{n=1}^{81} \frac{(a_n)^2}{2} + \sum \frac{(a_n)^2}{2}\cos(4\pi f_n t + 2\phi_n) + \quad (3)$$

$$\sum_{n=1}^{81}\sum_{m=1}^{81} a_n a_m \cos(2\pi(f_n \pm f_m)t + (\phi_n \pm \phi_m))$$
$$\text{for } m \neq n$$

The third order distortion $V_{3rd}$ (with third order nonlinear coefficient equal to unity), is given by:

$$V_{3rd} = \left(\sum_{n=1}^{81} a_n \cos(2\pi f_n t + \phi_n)\right)^3 = \frac{3}{4}\sum_{n=1}^{81} a_n^3 \cos(2\pi f_n t + \phi_n) + \quad (4)$$

$$\frac{1}{4}\sum_{n=1}^{81} a_n^3 \cos(6\pi f_n t + 3\phi_n) + \frac{3}{2}\sum_{n=1}^{81}\sum_{m=1}^{81} a_n a_m^2 \cos(2\pi f_n t + \phi_n) +$$
$$\text{for } m \neq n$$

$$\frac{3}{2}\sum_{n=1}^{81}\sum_{m=1}^{81} a_n^2 a_m \cos(2\pi(2f_n \pm f_m)t + (2\phi_n \pm \phi_m)) +$$
$$\text{for } m \neq n$$

$$\frac{3}{2}\sum_{n=1}^{81}\sum_{m=1}^{81}\sum_{k=1}^{81} a_n a_m a_k \cos(2\pi(f_n \pm f_m \pm f_k)t + (\phi_n \pm \phi_m \pm \phi_k)) \quad (5)$$
$$\text{for } m \neq n \neq k$$

These equations show the second and third order inter-modulation distortions as sums, differences and harmonics of the video carrier frequencies. They clearly show that it is the relationship between the phases of the video carriers $\Phi_n$ of the composite signal that determine the second and third order distortion effects on both the in-band and out-of-band frequencies. In addition, it is shown in (3) that only the second-order distortion at zero frequency, $$\sum_{n=1}^{81} \frac{(a_n)^2}{2},$$

is carrier phase-independent. Consequently, it is asserted by the inventors herein that the video carrier phases and the relationship between these phases must be set and periodically controlled to substantially minimize the second and third order distortion effects of the composite signal on both in-band and out-of-band frequencies. That is, it is asserted herein that in order to substantially minimize the second and third-order distortion effects of the composite signal on the in-band and out-of-band frequencies, the carrier phases must be set such that the video carriers have a relationship with respect to each other so that the composite signal has a second order distortion spectrum that is substantially a line spectrum with the major portion of the total second order distortion energy contained in the line which falls at zero frequency.

By setting the carrier phases to have a phase relationship to produce such a second order distortion spectrum, the third order distortion in both the in-band and out of band frequencies will be substantially minimized. This is because, in the frequency domain, the third-order distortion products are the convolution of the original composite signal spectrum with the second-order distortion spectrum. With the second-order distortion behaving essentially like a line spectrum at zero frequency having minimum side lobes, the third order distortion will contain essentially the phase-independent cross-modulation distortion terms and the unavoidable self compression/expansion carrier frequency terms and the third harmonic terms shown in (5).

Figure 2:
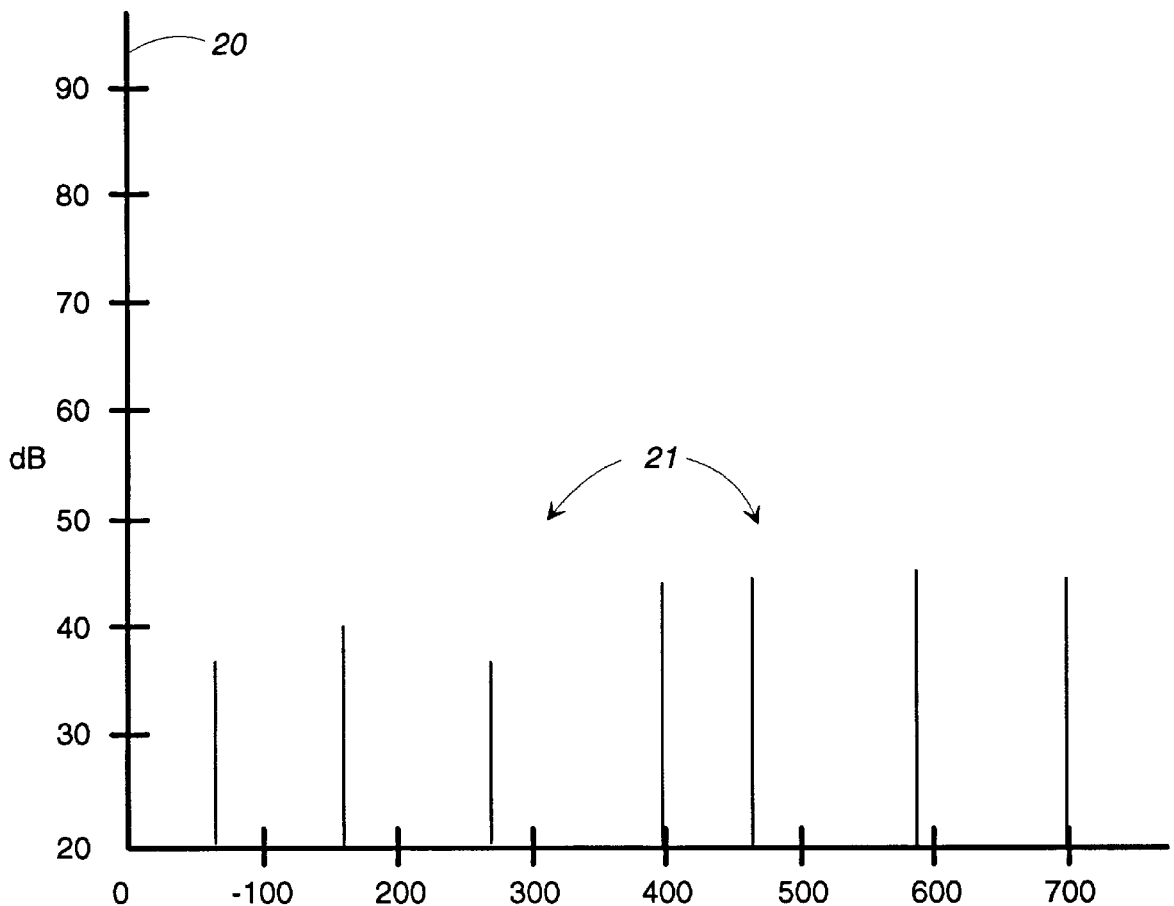
FIG. 2 is a graphical view of a second order distortion spectrum that is substantially a line spectrum with the major portion of the total second order distortion energy contained in the line which falls at zero frequency.

This distortion minimization principle is analogous to minimizing the sidelobes of the "ambiguity function" in the radar pulse compression technique in the time domain. Therefore, phase codes (relationships) which are desirable for pulse compression radar generally possess characteristics which can be used to achieve distortion minimization for both in-band and out-of-band distortion products. A graphical view of a second order distortion spectrum having substantially a pulse at DC is shown in FIG. 2. As shown, the second order distortion spectrum has a pulse 20 at DC and very minimal side lobes 21 at predetermined frequencies along the frequency spectrum.

To illustrate the reduction of the in-band and out-of band distortion of a multicarrier system wherein the carriers phases are tuned to adjust the second order distortion as described above, a composite signal having carriers with zero phases is compared to a composite signal having phases tuned to form the desired second order distortion spectrum. In each case the number of channels or carriers, the frequency of the carriers and the carrier amplitudes are held constant to make the comparison of the distortion effects depend solely on the difference in the carrier phases. More specifically, the composite signal of each multichannel system is a product of combining 81 harmonically related channels that span an in-band frequency spectrum from 54 to 534 MHz. The comparison of such a composite signal having carriers with zero phases versus such a signal having carriers with Frank phases is illustrated through FIGS. 3–6 and 7–10.

The Frank phases are a set of phase relationships $\{\Phi_n\}$ governed by the following matrix:

| 0 | 0 | 0 | . | . | 0 |
|---|---|---|---|---|---|
| 0 | 1 | 2 | . | . | (N − 1) |
| 0 | 2 | 4 | . | . | 2(N − 1) |
| . | . | . | . | . | . |
| . | . | . | . | . | . |
| 0 | (N − 1) | 2(N − 1) | . | . | (N − 1)(N − 1) | where $N=\sqrt{81}$ (i.e. N=9) is the number of video carriers and $\Phi_n=9/(2Pi)$ times the entry of the above matrix reading row-wise (or column-wise) is the phase of the nth video carrier. As shown in "Radar Signals an Introduction to Theory and Application", by Cook and Berfield, Academic Press, 1967, Chapter 8, the Frank phases have very good center peak to sidelobe peak ratio. One restriction is that the number of channels must be a perfect square of an integer.

In FIGS. 3–6 there is shown such a composite signal having carriers with a zero phase relationship with one another. The effect of this zero phase relationship on the second and third order distortion spectrum on both in-band and out-of-band frequencies is also shown. In FIGS. 7–10 there is shown such a composite signal having carriers with a Frank phase relationship with one another. The significantly reduced second and third order distortion on both the in-band and out-of-band frequencies is also shown. A more detailed description of the differences between the effect of the zero phase composite signal and the Frank phase composite signal on both the in-band and out-of-band frequencies is discussed below.

Figure 3:
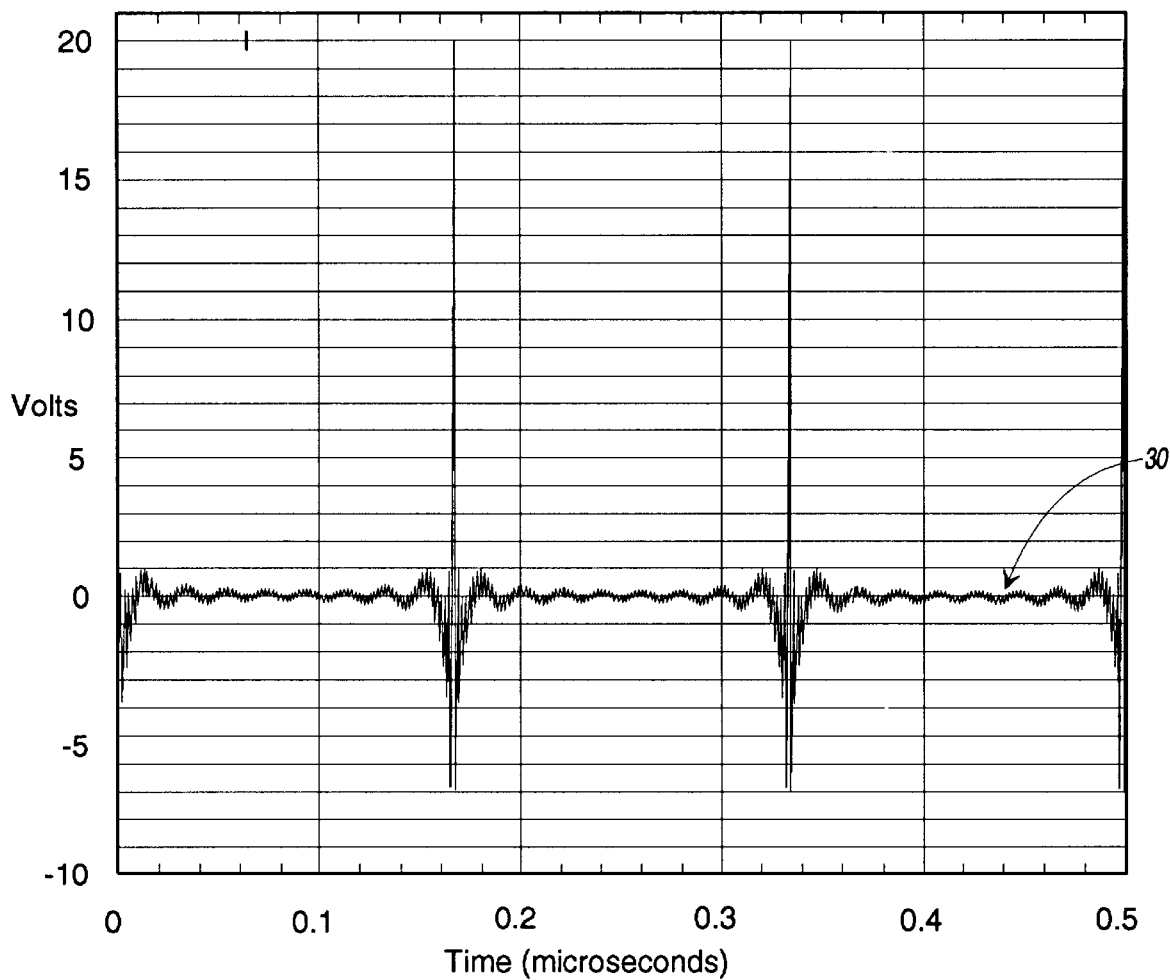
FIG. 3 is a graphical view of a composite signal voltage versus time for a multicarrier communications system having a composite signal composed of carrier frequencies having a zero phase relationship with one another.
Figure 4:
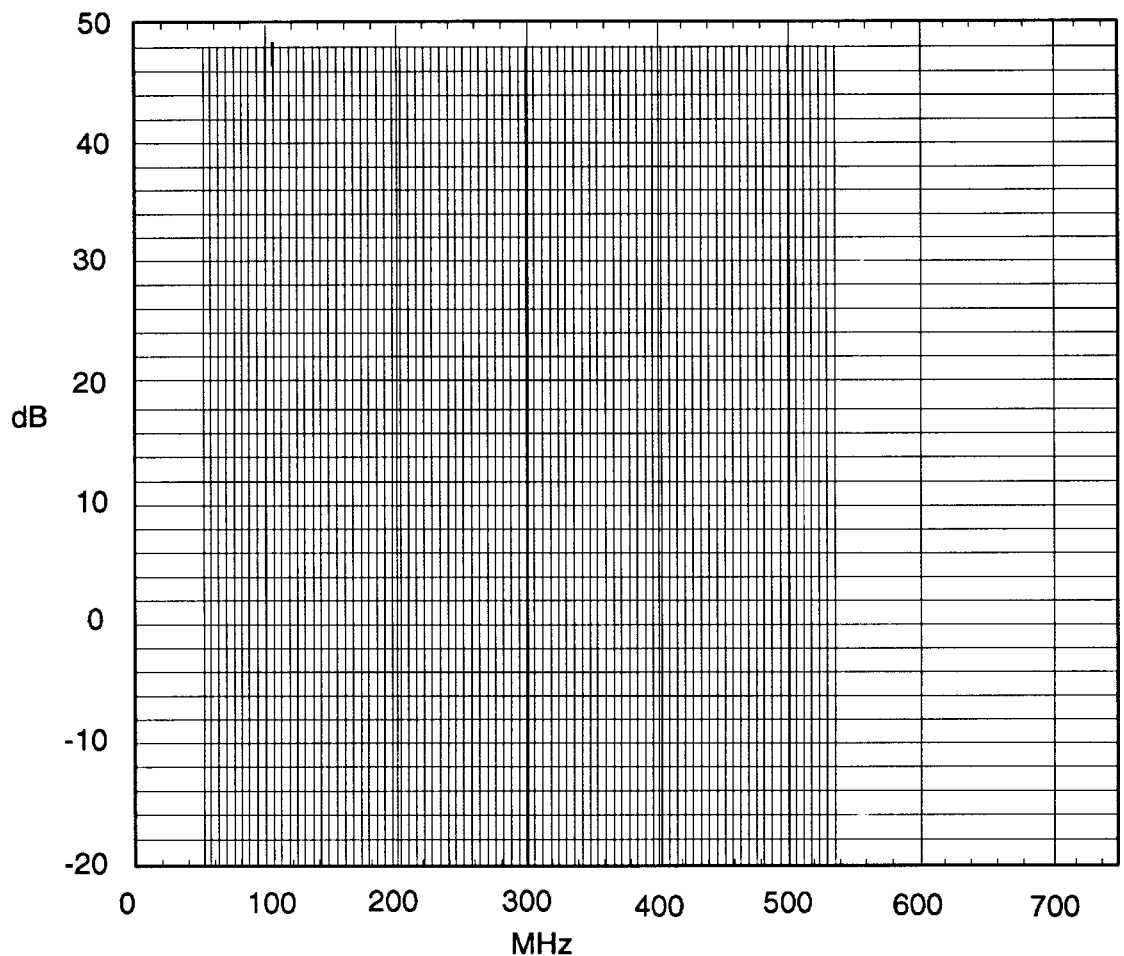
FIG. 4 is a graphical view of the composite signal shown in FIG. 3 in the frequency domain.

Referring now to FIG. 3, there is shown a graphical view of zero composite signal 30 in the time domain, wherein the harmonically related carriers of signal 30 have phases in a zero relationship with one another and all carriers have equal amplitudes. Note that the peak voltage of the zero phase composite signal 30 is over 20 volts. As will be discussed below, this is significantly higher, and thus less desirable in the face of system non-linearity's, than a composite signal having a lower peak voltage as with the Frank phase composite signal shown in FIG. 7. A graphical view of zero composite signal 30 in the frequency domain is shown in FIG. 4.

Figure 5:
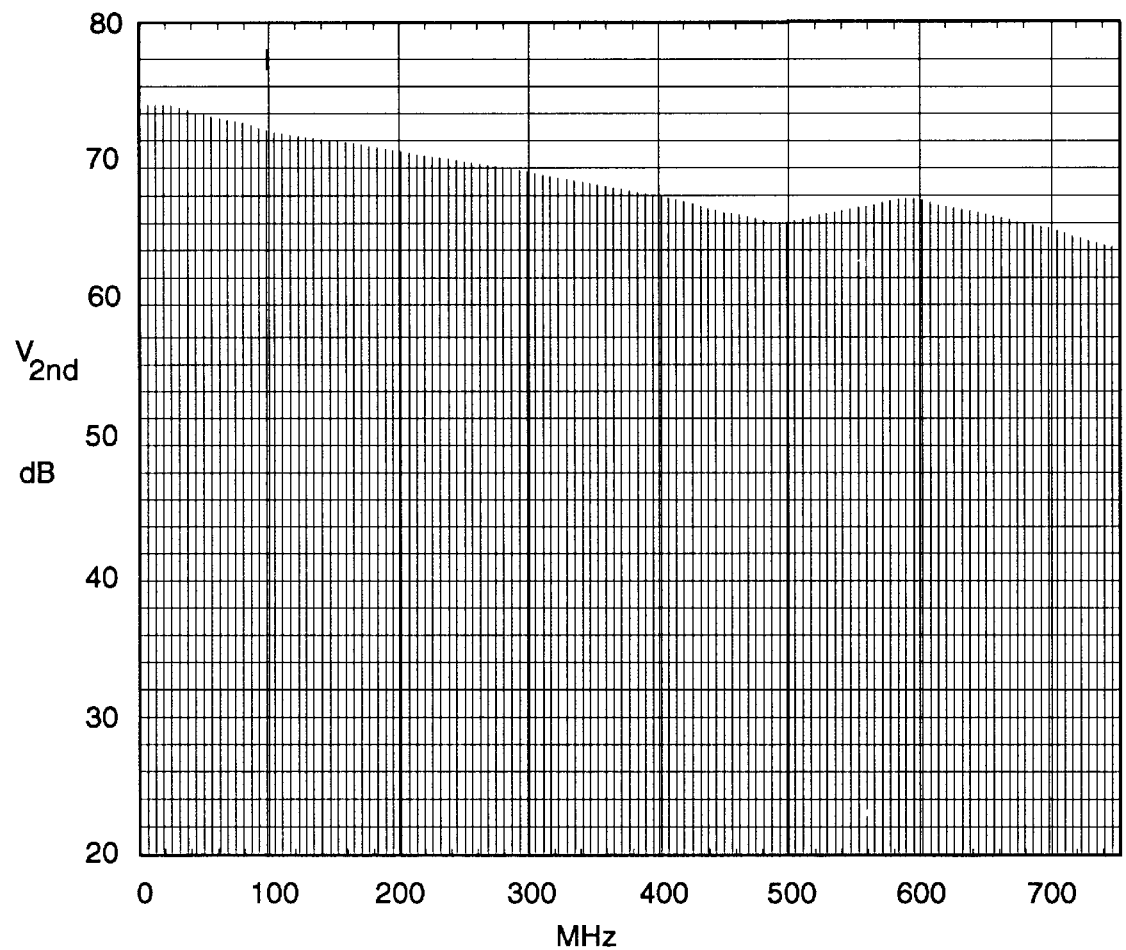
FIG. 5 is a graphical view of the second order distortion spectrum for a composite signal having carrier frequencies with a zero phase relationship with one another.
Figure 6:
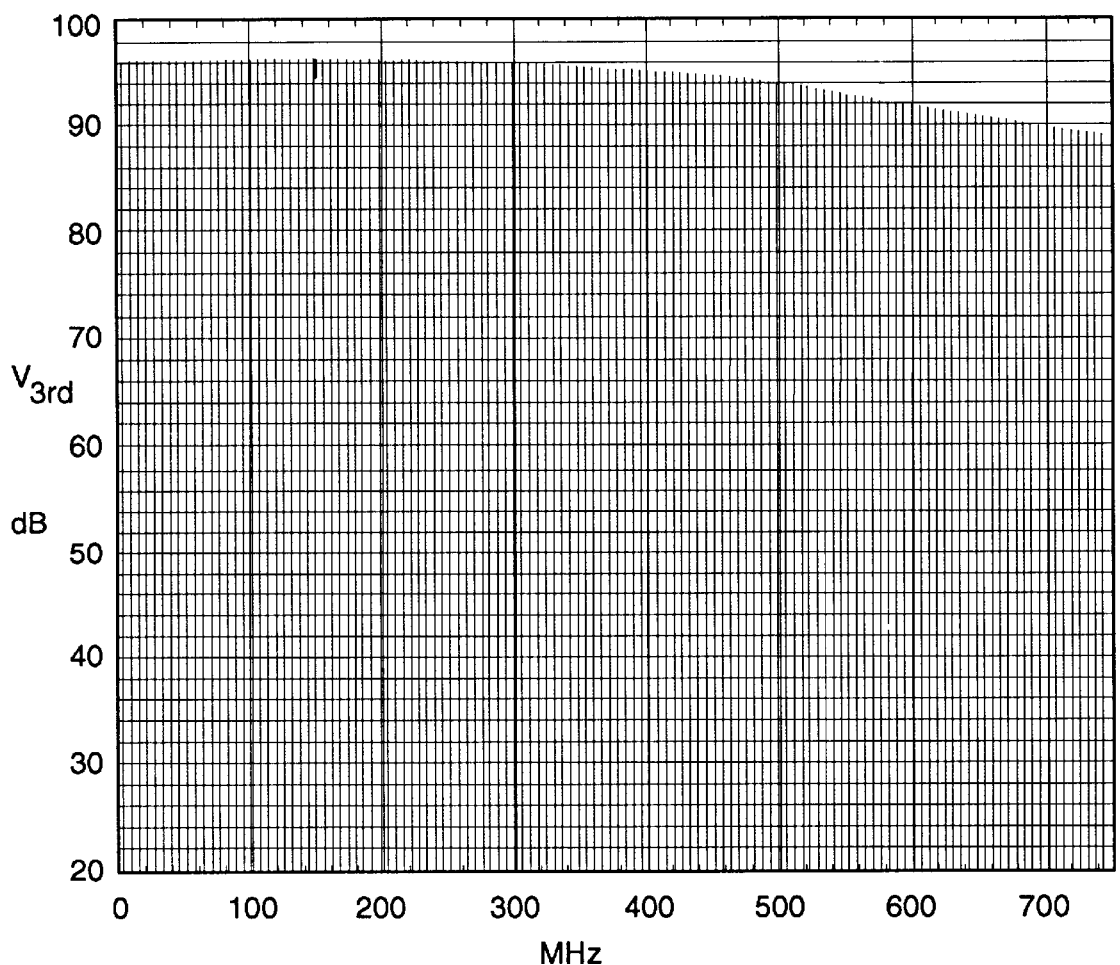
FIG. 6 is a graphical view of the third order distortion spectrum for a composite signal having carrier frequencies with a zero phase relationship with one another.

FIG. 5 shows the second order distortion spectrum of zero composite signal 30. As shown, zero phase composite signal 30 has large (above 50 dB) second order distortion components that extend well beyond the frequency band of the multichannel system. This is very undesirable for those having communications systems that utilize the frequency spectra outside the 50 to 550 MHz frequency band of the system illustrated herein. Similarly, the undesirable extension of the third order distortion spectrum outside the frequency spectrum of the present system is shown in FIG. 6.

Figure 7:
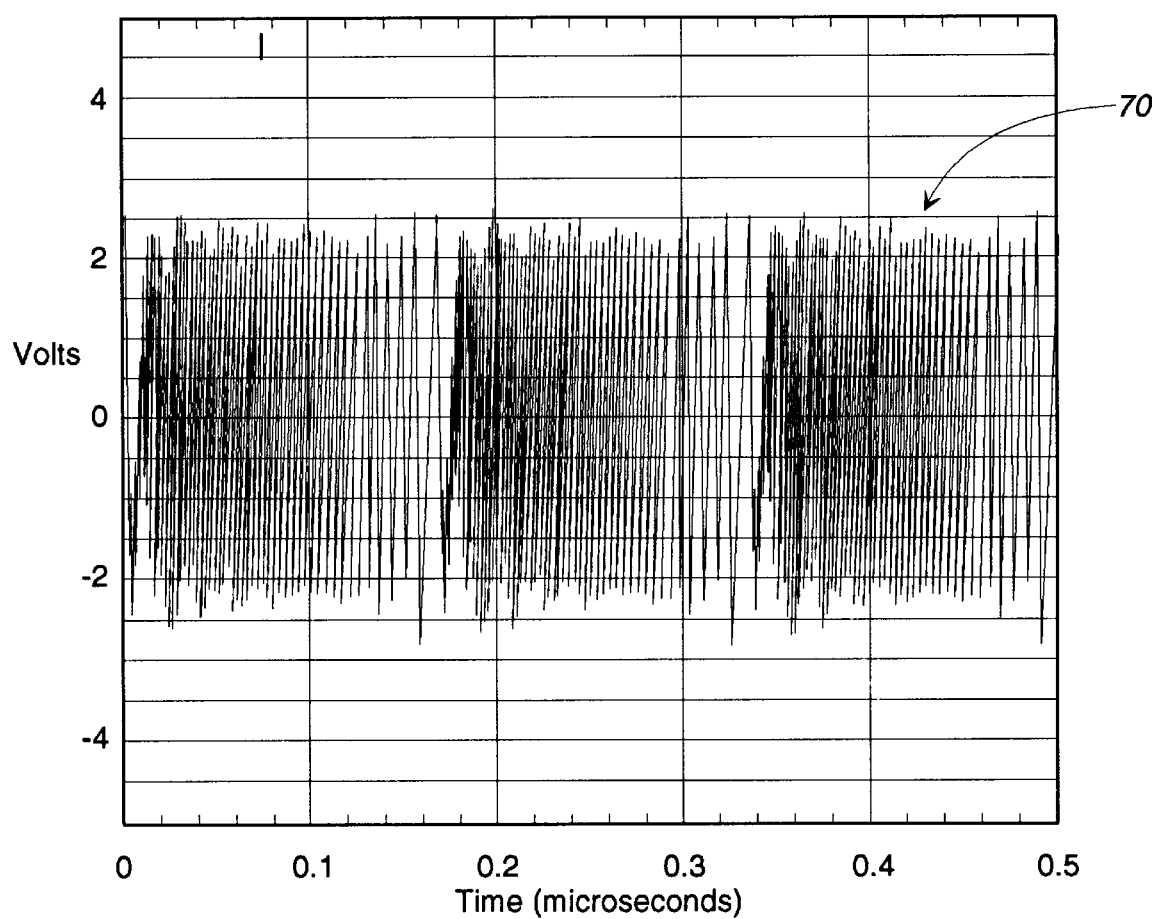
FIG. 7 is a graphical view of the time domain of a composite signal having carrier frequencies with the relationship of Frank phases.
Figure 8:
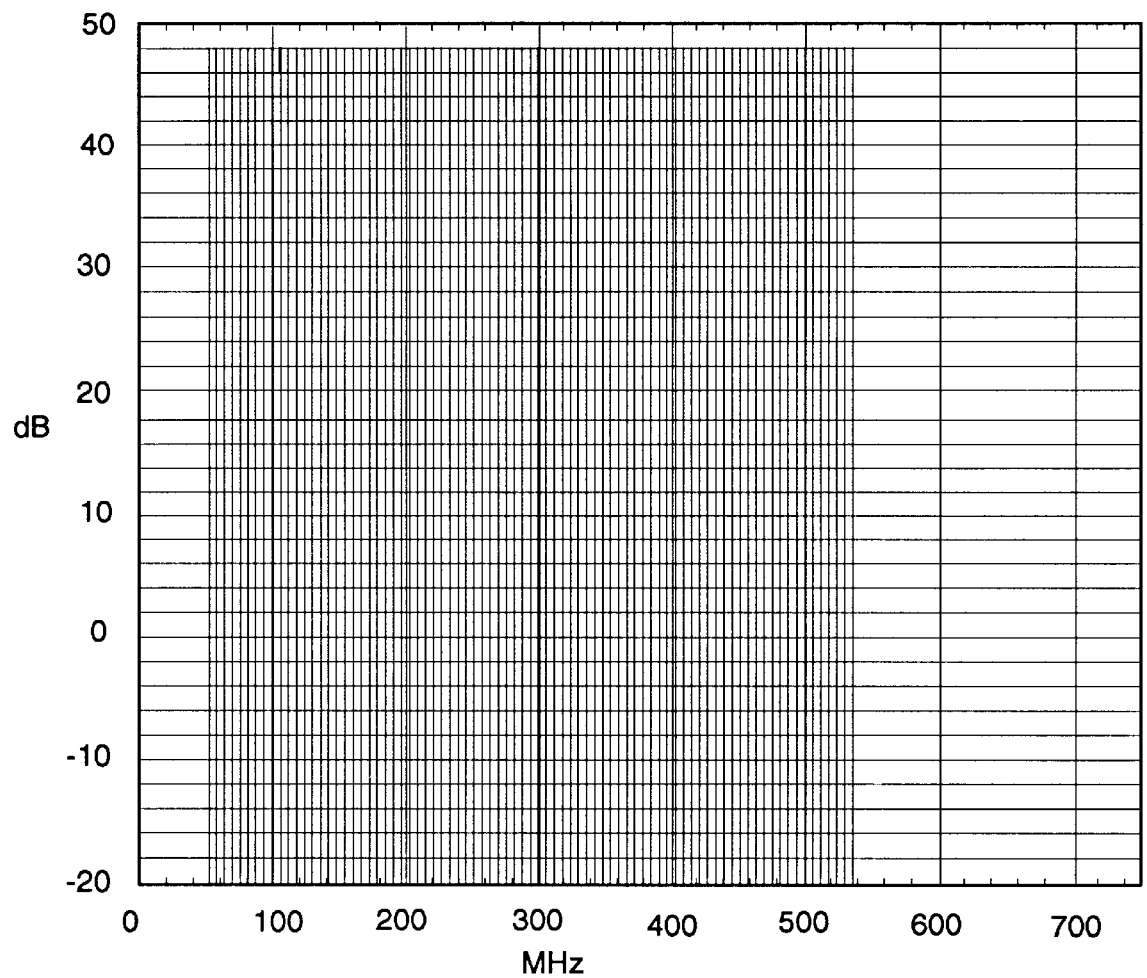
FIG. 8 is a graphical view of the Frank-phase composite signal shown in FIG. 7, but in the frequency domain.

Referring now to FIGS. 7 and 8, there is shown Frank phase composite signal 70 in the time and frequency domain, respectively. Note that signal 70 has a peak voltage much less than that of zero phase signal 30 shown in FIG. 3. As a result, signal 70 is much less susceptible to the degrading effects of non-linearity's in the system.

Figure 9:
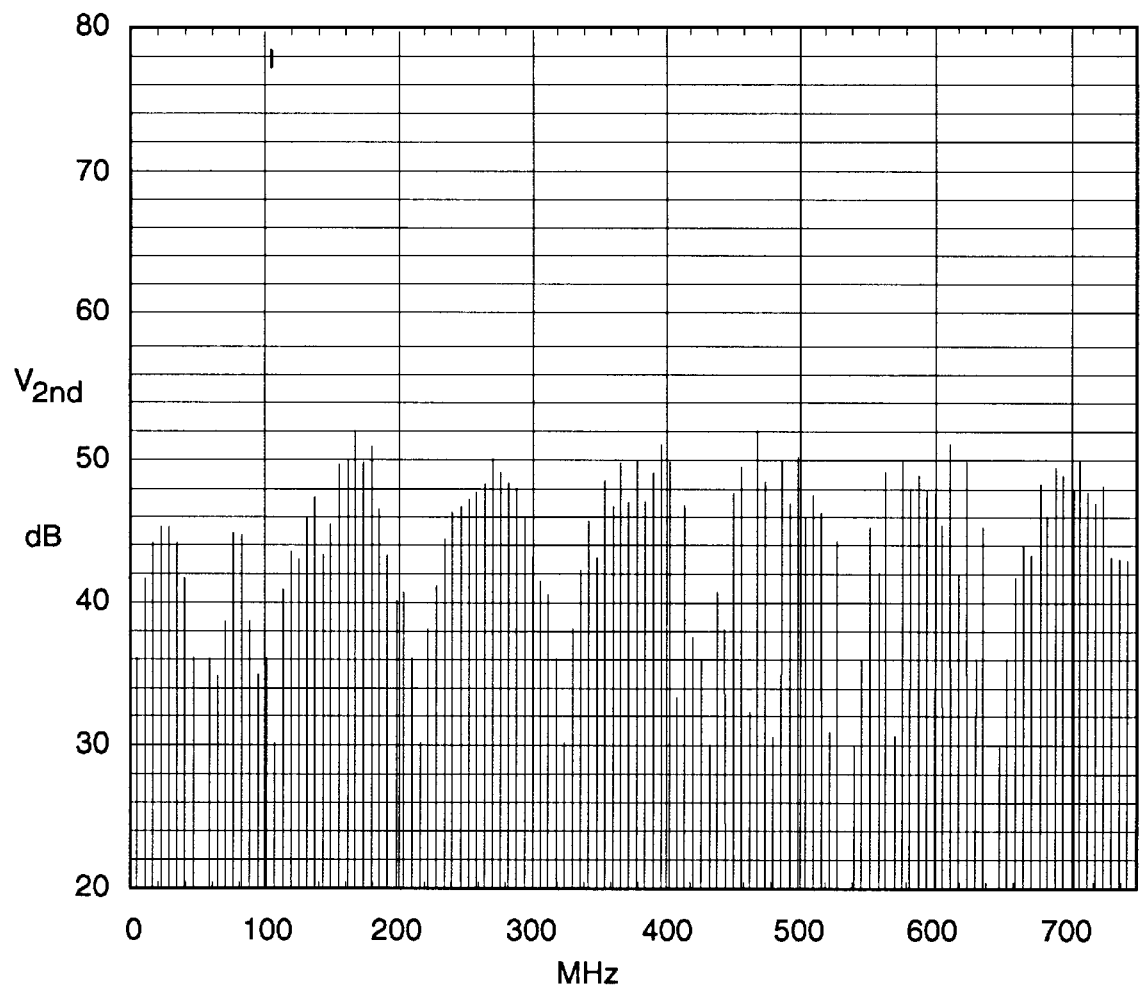
FIG. 9 is a graphical view of the second order distortion spectrum of the Frank-phase composite signal shown in FIG. 7.
Figure 10:
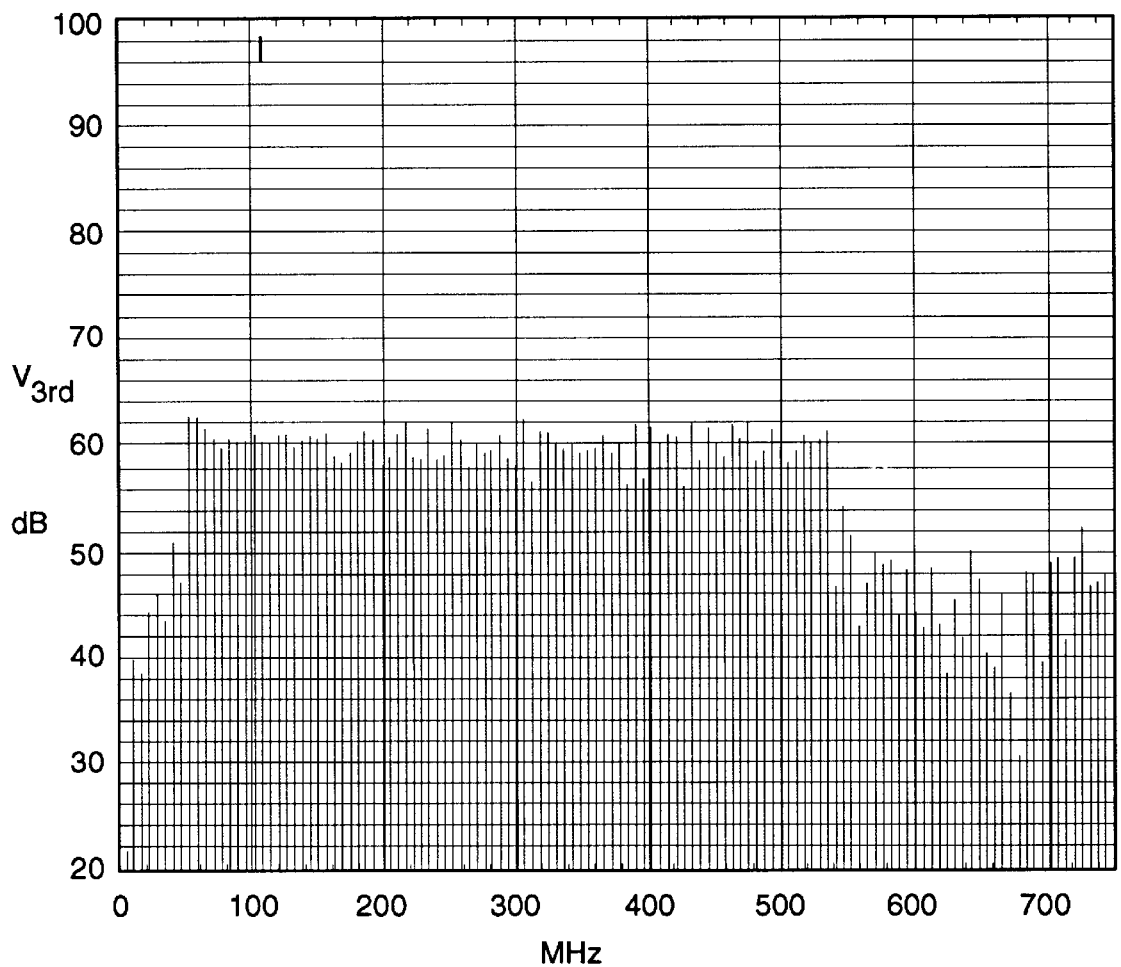
FIG. 10 is a graphical view of the third order distortion spectrum of the Frank-phase composite signal shown in FIG. 7.

The second and third order distortion spectrum of Frank phase composite signal 70 is shown in FIGS. 9 and 10. As shown, the second order distortion spectrum for Frank phase signal 70 is more pulse-like than that zero phase signal 30. As a result, the second and third order distortion of signal 70 is significantly reduced both in-band and out-of-band as compared to the distortion effects of zero phase signal 30 shown in FIGS. 5 and 6. Thus, for communications system having carriers that differ only by their phase relationship, the system having a carrier phase relationship that produces a second order distortion spectrum that is more pulse-like at DC will be less susceptible to nonlinear distortions.

While it is not asserted that Frank phases are the optimum phases for all multicarrier communications systems, a substantially optimum phase relationship for each individual system can be found (depending on the number of channels, the frequency spacing of the channels, etc.), as long as the phase relationship between the carriers is adjusted to make the second order distortion spectrum of the composite signal substantially like a line spectrum with the major portion of the total second order distortion energy contained in the line which falls at zero frequency. For example, the Newman phases $\{\Phi_n\}=Pi(n-1)(n-1)/K$, (where K is the number of channels and n is the channel number) will also produce an essentially impulse-like second-order spectrum at zero frequency. See, S.Boyd, "Multitone Signals with Low Crest Factor", IEEE Transactions on Circuits and Systems, Vol. CAS-33, Oct. 1986, pp 1018–1022. Moreover, it is not asserted that there is only one method or apparatus for tuning the phases to achieve this second order response, as long as the method or apparatus sets the desired phase relationship and maintains that relationship over time to adjust for any system timing drift or instability.

In light of this, any adjustment to the carriers that would generate a composite signal having the desired second order distortion spectrum would improve the distortion effects of the composite signal for both in-band and out-of-band frequencies over the prior art. Thus, the inventors herein assert that any adjustments to the time synchronization of the video repetition frequency, and the addition of linear delay distortion equalizers which compensate for impedance mismatches in the system and that make the second order distortion more like an impulse at DC, would reduce the distortion effects of the composite signal.

In addition, the inventors herein assert that it is desirable to start the system at t=0 with a minimum peak voltage, which is equivalent to using Sine instead of Cosine, in equations 1 through 5, to describe the composite signal. This further reduces the third order distortion products outside the frequency band of the system, especially for the lower out-of-band frequencies.

Lastly, it should be reemphasized that the third order distortion effects on out-of-band frequencies is further improved if the multicarrier communications system uses harmonically related carriers, HRC, rather than incrementally related carriers, IRC. Although, the incrementally related carriers can be phase tuned to minimize the distortion effects, a system using harmonically related carriers can be tuned to minimize the effects of third order distortion on out-of-band frequencies to lower levels than the same system using incrementally related carriers.

Figure 11:
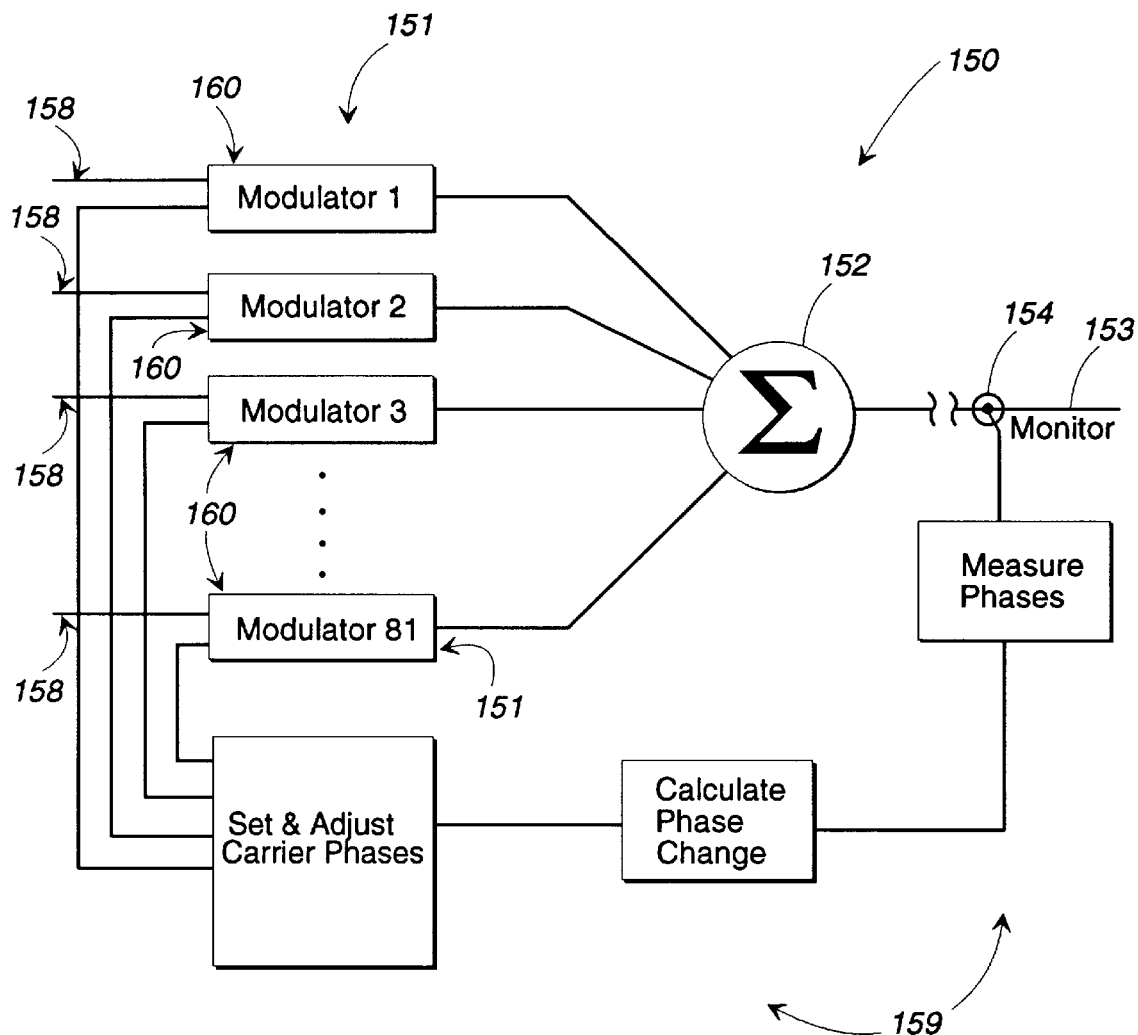
FIG. 11 is a block diagram of one embodiment of a multicarrier system that reduces in-band and out-of-band distortion according to the present invention.

One embodiment of a communication system that reduces the distortion effects according to the present invention is shown in FIG. 11, and hereinafter referred to as system 150. System 150 has a feedback phase-setting circuit 159 electrically connected between modulator inputs 160 and combiner 152. Feedback circuit 159 sets the desired initial carrier phases, and taps the composite signal from cable 153 to measure the carrier phases at predetermined time intervals and adjust the carrier phases so that the initial phase setting are maintained over time.

In operation of system 150, each reference carrier is sent through a separate line 158 to a dedicated modulator 151. The reference carrier or a video carrier, which is derived using a phase locked loop with the reference carrier as the phase locked loop reference, is then amplitude modulated by its respective TV signal. The predetermined carrier signals are harmonically related to each other and span an in band frequency spectrum from 54 MHz to the frequency of the highest TV channel used in the system. For an 81 channel system with a continuous frequency spectrum, as depicted in the figures, the top frequency would be 534 MHz. The number of channels used could be greater or less than 81 and there could be gaps in the channel frequency assignments. The resultant modulated carrier signals are then sent to combiner 152 wherein they are combined into a composite signal. The composite signal is then transmitted on cable 153 to the subscribers (not shown).

As described above, the carrier phases are initially set by phase setting feedback circuit 159 so that the composite signal has a second order distortion spectrum that is substantially a line spectrum with the major portion of the total second order distortion energy contained in the line which falls at zero frequency. In order to maintain the initial phases, feedback circuit 159 periodically monitors the composite signal, measures the phases of each carrier therein, and adjusts the carrier phases so that the initial phase settings are maintained over time.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A multi-frequency communications system of the type having a head-end system that generates a composite signal, the composite signal comprising a plurality of harmonically related, receivable signals that span an in-band frequency spectrum, said harmonically related receivable signals having an initial phase relationship with respect to each other to minimize distortion products produced by nonlinear components acting on the composite signal for in-band and out-of-band frequencies wherein said initial phase relationship between said carriers produces a second order distortion spectrum of said composite signal that is substantially an impulse at zero frequency having minimum side lobes, and wherein said side lobes have a magnitude of no more than fifty percent of the magnitude of said zero frequency impulse.

2. The multifrequency communications system of claim 1 wherein said harmonically related receivable signals are coherent.

3. The multifrequency communications system of claim 1 wherein said harmonically related receivable signals are incrementally related carriers.

4. The multifrequency communications system of claim 3 wherein said harmonically related receivable signals are related to channels of a CATV system and span a frequency spectrum from a lowest carrier frequency to a highest carrier frequency for said CATV channels.

5. The system of claim 4 wherein said in-band frequency spectrum is combined with an out-of-band frequency spectrum in a common transmission medium.

6. The multifrequency communications system of claim 1 further comprising a feedback phase-setting circuit for periodically adjusting the phase of each receivable signal so that said initial phase relationship of said carriers is maintained over time.

7. The communications system of claim 6 wherein said phase adjuster circuit sets the phase of each receivable signal so that the composite signal has substantially minimized distortion products outside the in-band frequency spectrum.

8. In a multicarrier communications system wherein a plurality of modulated carrier signals are combined to form a composite signal, said composite signal spanning an in-band frequency spectrum, a method for reducing both in-band and out-of-band distortion related to said composite signal comprising the steps of:

a. causing said plurality of carrier signals to be combined such that a harmonically related frequency relationship is established among said plurality of carrier signals; and b. controlling phases of said combined plurality of carrier signals in a manner to establish a predetermined relationship among said carrier signal phases such that a second order distortion spectrum of said composite signal is substantially an impulse at zero frequency having minimum side lobes, and wherein said side lobes have a magnitude of no more than fifty percent of the magnitude of said zero frequency impulse.

9. The method of claim 8 wherein said composite signal produces a distortion product that is substantially minimized for both the in-band and out-of-band frequencies.

10. A CATV communications system of the type having a head-end system that generates a composite signal, the composite signal comprising a plurality of harmonically related, receivable signals that span an in-band frequency spectrum, said harmonically related receivable signals having an initial phase relationship with respect to each other so that distortion of the composite signal for the in-band and out-of-band frequencies is minimized wherein said initial phase relationship between said carriers produces a second order distortion spectrum of said composite signal that is substantially an impulse at zero frequency having minimum side lobes, and wherein said side lobes have a magnitude of no more than fifty percent of the magnitude of said zero frequency impulse.

11. A method of reducing in-band and out-of-band distortion in a multi-carrier communication system in which a plurality of the carriers is individually modulated and then combined to form a composite signal, the method further comprising the steps of:

a. causing said plurality of carriers to be combined such that a harmonically related frequency relationship is established among said plurality of carriers; and b. controlling phases of said combined plurality of carriers in a manner to establish a predetermined relationship among said carrier phases such that a second order distortion spectrum of said composite signal is substantially an impulse at zero frequency having minimum side lobes, and wherein said side lobes have a magnitude of no more than fifty percent of the magnitude of said zero frequency impulse.

12. In a multi-carrier communication system having a composite signal formed from the combination of a plurality of harmonically related carrier signals, the improvement comprising:

said harmonically related carrier signals having phasing controlled in a manner to establish a predetermined relationship among respective carrier signal phases such that a second order distortion spectrum of said composite signal is substantially an impulse at zero frequency having minimum side lobes, and wherein said side lobes have a magnitude of no more than fifty percent of the magnitude of said zero frequency impulse.

13. The multicarrier system of claim 12 further comprising a circuit for adjusting said carrier phases so that said predetermined phase relationship is maintained over time.

14. The multicarrier system of claim 13 wherein the composite signal produces a distortion product that is minimized for both in-band and out-of-band frequencies.

15. The communications system of claim 14 wherein the system is a CATV cable system.

16. A multicarrier communications system, comprising:

a signal combiner for combining a plurality of harmonically related carriers into a composite signal, said carriers having frequencies that are integral multiples of each other;

a circuit for setting the phase of each carrier so that said carriers have an initial phase relationship with respect to each other, said phase relationship being such that a second order distortion spectrum of said composite signal is substantially an impulse at zero frequency having minimum side lobes, and wherein said side lobes have a magnitude of no more than fifty percent of the magnitude of said zero frequency impulse;

a feedback circuit for periodically adjusting said carrier phases to maintain said initial phase relationship over time.

17. A method of reducing the effects of intermodulation distortion in a multifrequency communication system having a plurality of harmonically related frequency channels, said channels being combined into a composite signal and spanning an in-band frequency spectrum, comprising the steps of:

a. setting the phase of each in-band frequency channel to establish an initial phase relationship between said frequency channels so that a second order distortion spectrum of said composite signal is substantially an impulse at zero frequency having minimum side lobes, and wherein said side lobes have a magnitude of no more than fifty percent of the magnitude of said zero frequency impulse; and b. periodically adjusting said channel phases to maintain said initial phase relationship over time.

* * * * *